Patented Mar. 30, 1937

2,075,171

UNITED STATES PATENT OFFICE 2,075,171

PROCESS FOR DESULPHURIZING HYDROCARBONS

Albert E. Buell and Walter A. Schulze, Bartlesville, Okla., assignors to Phillips Petroleum Company, Bartlesville, Okla., a corporation of Delaware No Drawing. Original application June 10, 1932, Serial No. 616,574. Divided and this application May 21, 1935, Serial No. 22,656

8 Claims. (Cl. 196—28)

This application is a division of our co-pending application, Serial No. 616,574, filed June 10, 1932, entitled "Process for desulphurizing hydrocarbons", wherein it is shown that certain minerals constitute effective contact agents for the vapor phase desulphurization of hydrocarbons by which a part of the organically combined sulphur is eliminated as hydrogen sulphide.

This invention relates to processes for treating sulphur bearing hydrocarbon mixtures such as natural or refinery gases, the naphtha derived from the distillation or cracking of petroleum, oil shale distillates, and other hydrocarbon products from which the removal of certain sulphur compounds is desired.

More specifically it relates to the partial desulphurization of straight run and cracked gasolines, to which the process is particularly applicable, and the following disclosure will be limited to this application of the process for the sake of simplicity, but it will be understood that a similar procedure is followed in treating the other hydrocarbons mentioned.

To meet the specifications for motor fuel with respect to sulphur content, distillates from high sulphur petroleum require a drastic treatment for sulphur removal. It is well known that the method in most common use at present is objectionable from the standpoint of losses in volume and quality of product, as well as of excessive cost.

To overcome these objections, processes have been devised for sulphur removal which are based on the known catalytic action of certain contact agents on sulphur compounds in the vapor phase at elevated temperatures, in which the sulphur is eliminated as hydrogen sulphide. The present invention is an improvement of processes of this type, particularly with respect to the nature and preparation of the contact agents employed.

The catalysts proposed by previous investigators are metals, or oxides or sulphides of metals. Metals known to be hydrogenation catalysts have a limited usefulness in a process primarily employed to eliminate sulphur rather than to obtain hydrogenation effects, because of their ability to cause rapid decomposition of hydrocarbons under the operating conditions with accompanying deposition of carbonaceous residues and consequent poisoning of the catalyst. Therefore, metallic sulphides, oxides, or oxides convertible to sulphides during the desulphurization process are advantageously employed, as their action is more exclusively confined to the sulphur impurities in the hydrocarbons.

The oxides and sulphides mentioned, which are used in desulphurization processes, are at present synthetically prepared as more or less pure compounds, and are often deposited upon or admixed with more or less inactive carriers. The use and preparation of these synthetic substances is unduly expensive, and such catalysts usually have no salvage value when their usefulness as contact agents has been outlived. Undoubtedly it is for these reasons that the general adoption of catalytic desulphurization processes, the principles of which have been long and widely known, has been so unduly delayed. Another disadvantage of the synthetically prepared agents is that their usual form is a finely precipitated powder, which is inconvenient to handle, difficult to maintain in a reaction chamber thru which gases are moving at a high velocity, and which tends to pack and produce a high back pressure if it cannot be incorporated in a suitable carrier.

The primary object of this invention is to provide a novel catalyst for use in processes for desulphurizing hydrocarbons containing organic sulphur compounds as impurities, the sulphur being eliminated in the form of hydrogen sulphide, which catalyst overcomes the several objections, previously enumerated, to the specially prepared catalysts used by previous investigators.

We have found that certain naturally occurring substances, containing compounds of the class mentioned above as contact agents, may be used substantially in their original state as catalysts.

These substances are relatively inexpensive compared to the corresponding synthetic compound. Moreover, their natural form is in many ways superior to the synthetic form, as the natural crystals or lumps of these substances may be easily reduced by crushing to a convenient and efficient size for contact purposes as contrasted with the powdery form of the synthetic compound. Furthermore, the natural substance is often as efficient, or even more so (in proportion to the percentage of active element present) as the prepared agent.

The naturally occurring substances referred to are metallic minerals or ores of these minerals which consists of oxides and sulphides of the metals whose oxides are grouped as dehydration and dehydrogenation catalysts, e. g., aluminum, tungsten, vanadium, chromium, cadmium, zinc, molybdenum, etc. Examples of these minerals are chromite, vanadinite, molybdenite, molybdite, descloizite, wolframite, bauxite, etc.

Temperatures of the order of 500–800° F. are usually necessary, depending on (1) the particular mineral used as catalyst, (2) the time of contact between the petroleum product and the catalytic material, and (3) the specific properties of the hydrocarbon vapor which is being desulphurized. Temperatures of 600-700° F. are usually preferred when straight run naphthas or cracked distillates are the products undergoing treatment. High pressures are not needed, extremely good results being obtained at atmospheric pressure. In practice it is usually desired to use pressures somewhat above atmospheric so that the vapors can be directly conducted to a fractionator or to treating tanks for final processing.

This conversion of the organic sulphur compounds to hydrogen sulphide may be accompanied by dehydrogenation of some of the hydrocarbons present, depending on the particular catalyst and the temperature used.

The presence of hydrogen gas in the sulphur bearing petroleum vapor aids in the conversion of the sulphur compounds to hydrogen sulphide when certain of the minerals, for example, vanadinite, are used as catalysts. Hydrogen sulphide (in small quantities) and inert gases along with the petroleum vapor apparently make little difference in the amount of desulphurization which can be obtained in one passage over the mineral catalyst.

A typical process for desulphurization of cracked gasoline consists in passing the superheated vapors thru a bed of catalytic material maintained at an elevated temperature, say 700° F., which eliminates a part or all the sulphur from mercaptans, alkyl sulphides, etc., as hydrogen sulphide. The condensed vapors are then freed of hydrogen sulphide by a caustic wash or other suitable means.

In the practice of the present invention, the catalytic material may comprise one or more of the minerals set forth, crushed to a suitable size, usually 30–60 mesh, and possibly concentrated or diluted according to its activity. Diluents may comprise naturally associated active and/or inactive substances or substances which are suitable for diluting purposes altho not naturally associated with the catalytic material.

*Example I.*—Vapors of a sour cracked gasoline containing 0.142% sulphur were passed over a catalyst comprising a crushed ore (30–60 mesh) containing the minerals vanadinite and descloizite at a temperature of 700° F. and at a rate such that the contact time was about two seconds. The resulting product was sweet, indicating that the mercaptans present had been completely converted, and had a sulphur content of 0.089%.

The same catalyst also effected a reduction of sulphur content of from 0.091% to 0.034% and completely sweetened a sour straight run naphtha at the same temperature and flow rate.

*Example II.*—Chromite crushed to 30–60 mesh and maintained at a temperature of 700° F. was used as the catalyst. Vapors of a sour straight run naphtha were passed over at a rate to produce a contact time of about two seconds with an effect identical to that described in the previous example. Prolonged passage of this product over the catalyst failed to produce an appreciable change in its activity. In the next run over the same catalyst, 10% by volume of butyl mercaptan was added to the naphtha. The enormous sulphur content of this product was completely converted to hydrogen sulphide, as shown by testing the condensate with cadmium sulphate solution. After this severe abuse of the catalyst, it was no longer able at the same flow rate, to produce a completely sweet product, but was still capable of effecting a very satisfactory sulphur reduction, about 45%, in naphthas of usual sulphur content, and the products were only very slightly sour. The catalyst was kept in continuous operation for a period of seven days after the butyl mercaptans solution was passed over it, during which time a total of about 700 volumes (liquid) of gasoline was treated. The sulphur reduction on the final sample was substantially the same as that on the first sample, i. e., about 45% of the sulphur originally present.

While it is possible to operate this process in such a way that a completely sweetened gasoline is obtained as in Example I described above, it is not meant to be construed that such a product is always obtained in actual operation. The rate of conversion of the organic sulphur compounds to hydrogen sulphide increases with both an increase in temperature and a longer contact time between the vapors and the catalytic material. Since these factors must always be taken into consideration, it is sometimes desirable to use such an extremely short time of contact and/or such a low temperature that the resulting product is not entirely free of mercaptans altho a substantial sulphur reduction is obtained.

Having described the invention, what is claimed is:

1. The process of desulphurizing petroleum hydrocarbon fluid containing organic sulphur compounds as impurities, comprising heating the fluid in the vapor state to a temperature within the range of 500° to 800° F., contacting the vapors at substantially the same temperature with a catalyst consisting of crude mineral ore containing a substantial proportion of a vanadium compound, whereby the organic sulphur compounds are decomposed into hydrogen sulphide, and separating the hydrogen sulphide from the hydrocarbon fluid.

2. The process of desulphurizing petroleum oil with a boiling point lower than the end point of kerosene, comprising vaporizing the oil, superheating the vapors containing organic sulphur compounds to a temperature within the range of 500° to 800° F., contacting the vapors at substantially the same temperature for a period of about 2 to 10 seconds with a vanadium mineral catalyst, whereby the organic sulphur compounds are decomposed into hydrogen sulphide, and separating the hydrogen sulphide from the oil.

3. The process of desulphurizing gasoline containing organic sulphur compounds as impurities, comprising vaporizing the gasoline, superheating the vapors to a temperature within the range of about 600° to 800° F., contacting the vapors for a period of about 2 to 10 seconds with a catalyst consisting of crude mineral ore containing a substantial proportion of a vanadium compound, and separating the decomposed sulphur impurities from the gasoline.

4. The process of sweetening gasoline containing mercaptans as impurities, comprising vaporizing the gasoline, superheating the vapors to a temperature within the range of 600° to 800° F., contacting the vapors for a period of about 2 to 10 seconds with a catalyst consisting of crude mineral ore containing a substantial proportion of a vanadium compound, whereby the mercaptans are decomposed into hydrogen sulphide, separating the hydrogen sulphide from the gasoline, and thereby obtaining a sweetened gasoline.

5. The process of desulphurizing petroleum oil containing organic sulphur compounds as impurities, said oil having a boiling point lower than the end point of kerosene, comprising vaporizing the oil, superheating the vapors to a temperature within the range of 500° to 800° F., contacting the vapors at substantially the same temperature for a period of about 2 to 10 seconds with a catalyst consisting of vanadinite ore, and separating the decomposed sulphur impurities from the oil.

6. The process of desulphurizing petroleum oil containing organic sulphur compounds as impurities, said oil having a boiling point lower than the end point of kerosene, comprising vaporizing the oil, superheating the vapors to a temperature within the range of 500° to 800° F., contacting the vapors at substantially the same temperature for a period of about 2 to 10 seconds with a catalyst consisting of descloizite ore, and separating the decomposed sulphur impurities from the oil.

7. In a process of desulphurizing gasoline in the vapor state, the steps which comprise superheating the vapors to a temperature within the range of about 600° to 800° F., contacting the vapors at substantially the same temperature for a period of about 2 to 10 seconds with a catalyst consisting of vanadinite ore, and separating the decomposed sulphur impurities from the gasoline.

8. The process of desulphurizing petroleum hydrocarbon gases containing organic sulphur compounds as impurities, comprising heating the gases to a temperature within the range of 500° to 800° F., contacting the gases at substantially the same temperature with a catalyst consisting of crude mineral ore containing a substantial proportion of a vanadium compound, whereby the organic sulphur compounds are decomposed into hydrogen sulphide, and separating the hydrogen sulphide from the hydrocarbon gases.

ALBERT E. BUELL.
WALTER A. SCHULZE.